United States Patent
Wada et al.

(10) Patent No.: US 9,519,528 B2
(45) Date of Patent: Dec. 13, 2016

(54) CHECKING UNDOABILITY OF AN API-CONTROLLED COMPUTING SYSTEM

(71) Applicant: NATIONAL ICT AUSTRALIA LIMITED, Eveleigh (AU)

(72) Inventors: Hiroshi Wada, Eveleigh (AU); Ingo Weber, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 0 days.

(21) Appl. No.: 14/784,887

(22) PCT Filed: Apr. 14, 2014

(86) PCT No.: PCT/AU2014/000429
§ 371 (c)(1),
(2) Date: Oct. 15, 2015

(87) PCT Pub. No.: WO2014/169331
PCT Pub. Date: Oct. 23, 2014

(65) Prior Publication Data
US 2016/0077900 A1     Mar. 17, 2016

(30) Foreign Application Priority Data

Apr. 19, 2013  (AU) ................ 2013901384
Aug. 8, 2013  (AU) ................ 2013902983

(51) Int. Cl.
*G06F 3/00*   (2006.01)
*G06F 9/44*   (2006.01)
(Continued)

(52) U.S. Cl.
CPC ........... *G06F 9/542* (2013.01); *G06F 9/44505* (2013.01); *G06F 11/008* (2013.01)

(58) Field of Classification Search
CPC ...................................................... G06F 9/542
(Continued)

(56) References Cited

U.S. PATENT DOCUMENTS 5,263,136 A   11/1993   DeAguiar et al.
5,481,710 A   1/1996   Keane et al.
(Continued)

FOREIGN PATENT DOCUMENTS

EP   0 097 239   5/1983
EP   0 465 018   6/1991
(Continued)

OTHER PUBLICATIONS

Ingo Weber et al., *Automatic Undo for Cloud Management via AI Planning*, NICTA, Sydney and School of Computer Science and Engineering, University of New South Wales, 2012, 6 pages.

*Primary Examiner* — Timothy A Mudrick (57) ABSTRACT

The present invention generally relates to an application program interface (API)-controlled computing system (100). A computer-implemented method is proposed for determining undoability of an action to be conducted in the API-controlled computing system (100) represented by a formal domain model. A set of pre-states of the API-controlled computing system (100) for the action are obtained. A set of post-states of the API-controlled computing system (100) corresponding to each pre-state in the set of pre-states for the action are obtained. The method automatically determines if each post-state in each set of post-states of the API-controlled computing system can be undone to its pre-state in the set of pre-states by using a reachability task for the post-state and its pre-state. The action to be conducted in the API-controlled computing system (100) is undoable if each post-state in each set of (Continued)

post-states of the API-controlled computing system (100) can be undone to its pre-state in the set of pre-states.

22 Claims, 3 Drawing Sheets (51) Int. Cl.
| | | |
|---|---|---|
| G06F 9/46 | (2006.01) | |
| G06F 13/00 | (2006.01) | |
| G06F 9/54 | (2006.01) | |
| G06F 11/00 | (2006.01) | |
| G06F 9/445 | (2006.01) | |

(58) Field of Classification Search
USPC .......................................................... 719/318
See application file for complete search history.

(56) References Cited

U.S. PATENT DOCUMENTS

| | | |
|---|---|---|
| 5,734,916 A | 3/1998 | Greenfield et al. |
| 5,850,508 A | 12/1998 | Lee et al. |
| 5,870,763 A | 2/1999 | Lomet |
| RE36,145 E | 3/1999 | DeAguiar et al. |
| 5,933,838 A | 8/1999 | Lomet |
| 5,946,698 A | 8/1999 | Lomet |
| 5,983,361 A | 11/1999 | Lee et al. |
| 5,990,906 A | 11/1999 | Hudson et al. |
| 6,014,657 A | 1/2000 | Weida et al. |
| 6,067,550 A | 5/2000 | Lomet |
| 6,111,575 A | 8/2000 | Martinez et al. |
| 6,151,607 A | 11/2000 | Lomet |
| 6,295,610 B1 | 9/2001 | Ganesh et al. |
| 6,490,594 B1 | 12/2002 | Lomet |
| 6,543,006 B1* | 4/2003 | Zundel .................. G06F 11/141 714/15 |
| 6,588,011 B1 | 7/2003 | Giammaria |
| 6,604,237 B1 | 8/2003 | Giammaria |
| 6,757,905 B1 | 6/2004 | Friedman et al. |
| 6,785,696 B2 | 8/2004 | Mosher, Jr. et al. |
| 6,978,279 B1 | 12/2005 | Lomet et al. |
| 7,003,695 B2 | 2/2006 | Li |
| 7,047,386 B1 | 5/2006 | Ngai et al. |
| 7,117,504 B2 | 10/2006 | Smith et al. |
| 7,136,062 B1 | 11/2006 | Butler |
| 7,167,182 B2 | 1/2007 | Butler |
| 7,203,866 B2 | 4/2007 | Di Fabbrizio et al. |
| 7,234,076 B2 | 6/2007 | Daynes et al. |
| 7,310,684 B2 | 12/2007 | Patrick et al. |
| 7,356,679 B1 | 4/2008 | Le et al. |
| 7,437,525 B2 | 10/2008 | Yang et al. |
| 7,441,015 B2 | 10/2008 | Ruellan et al. |
| 7,509,351 B2 | 3/2009 | Lomet et al. |
| 7,567,257 B2 | 7/2009 | Antoch et al. |
| 7,574,419 B2 | 8/2009 | Krishnaswamy et al. |
| 7,607,125 B2 | 10/2009 | Shinnar et al. |
| 7,644,414 B2 | 1/2010 | Smith et al. |
| 7,734,958 B1 | 6/2010 | Di Fabbrizio et al. |
| 7,810,071 B2 | 10/2010 | Thebes et al. |
| 8,283,778 B2 | 10/2012 | Trezza |
| 8,311,682 B2 | 11/2012 | Noureldin et al. |
| 2002/0138595 A1 | 9/2002 | Ruellan et al. |
| 2002/0184239 A1 | 12/2002 | Mosher, Jr. et al. |
| 2003/0037181 A1 | 2/2003 | Freed |
| 2003/0105885 A1 | 6/2003 | McArdle |
| 2003/0140272 A1 | 7/2003 | Lawrance et al. |
| 2003/0167355 A1 | 9/2003 | Smith et al. |
| 2003/0208464 A1 | 11/2003 | Lee et al. |
| 2003/0208500 A1 | 11/2003 | Daynes et al. |
| 2005/0114771 A1 | 5/2005 | Piehler et al. |
| 2006/0277251 A1 | 12/2006 | Tohyama et al. |
| 2007/0083488 A1 | 4/2007 | Krishnaswamy |
| 2007/0100967 A1 | 5/2007 | Smith et al. |
| 2008/0127065 A1 | 5/2008 | Bryant et al. |
| 2008/0177994 A1 | 7/2008 | Mayer |
| 2008/0268762 A1 | 10/2008 | Bruggen et al. |
| 2009/0070295 A1 | 3/2009 | Otomori et al. |
| 2009/0217303 A1* | 8/2009 | Grechanik .......... G06F 11/3414 719/320 |
| 2011/0106776 A1 | 5/2011 | Vik |
| 2012/0265959 A1 | 10/2012 | Le et al. |
| 2013/0080480 A1 | 3/2013 | Mao et al. |

FOREIGN PATENT DOCUMENTS

| | | |
|---|---|---|
| EP | 0 465 019 | 6/1991 |
| EP | 0 447 581 | 9/1991 |
| EP | 0 506 321 | 3/1992 |
| EP | 0 236 743 | 12/1993 |
| EP | 0 295 424 | 4/1994 |
| EP | 0 702 292 | 3/1996 |
| EP | 0 595 925 | 9/1997 |
| EP | 0 943 997 | 9/1999 |
| EP | 1 197 856 | 8/2001 |
| EP | 0 613 083 | 1/2002 |
| EP | 1 331 785 | 1/2002 |
| EP | 1 016 007 | 11/2002 |
| EP | 1 308 839 | 5/2003 |
| EP | 2 211 296 | 7/2010 |
| EP | 2 230 793 | 9/2010 |
| EP | 2 269 945 | 1/2011 |
| WO | WO 93/01549 | 1/1993 |
| WO | WO 97/00492 | 1/1997 |
| WO | WO 98/00795 | 1/1998 |
| WO | WO 98/21669 | 5/1998 |
| WO | WO 00/52887 | 9/2000 |
| WO | WO 00/58873 | 10/2000 |
| WO | WO 00/65458 | 11/2000 |
| WO | WO 2004/077261 | 9/2004 |
| WO | WO 2006/121500 | 11/2006 |
| WO | WO 2007/051153 | 5/2007 |
| WO | WO 2007/122030 | 11/2007 |
| WO | WO 2008/024507 | 2/2008 |
| WO | WO 2008/106642 | 9/2008 |
| WO | WO 2008/109317 | 9/2008 |
| WO | WO 2008/115553 | 9/2008 |
| WO | WO 2011/044436 | 4/2011 |
| WO | WO 2011/044438 | 4/2011 |

\* cited by examiner

FIG. 4B         Projection: remove failure

CHECKING UNDOABILITY OF AN API-CONTROLLED COMPUTING SYSTEM

CROSS-REFERENCE TO RELATED APPLICATIONS

The present application claims priority from the Australian provisional applications 2013901384 filed on 19 Apr. 2013, 2013902983 filed on 8 Aug. 2013 with National ICT Australia being the applicant and the contents of which are incorporated herein by reference.

TECHNICAL FIELD

The present invention generally relates to an application program interface (API)-controlled computing environment, including use, modelling and analysis thereof. Aspects of the invention include computer-implemented methods, software and computer systems for checking undoability of an API-controlled computing system.

BACKGROUND

An API-controlled computing environment, typically including an API-controlled computing system such as a cloud computing system, is normally managed by a set of system administration commands, which is called application program interface. For instance, creating and configuring a virtualized Web server on Amazon Web services (AWS) can be done with a few calls to operations that are offered through the AWS management API. This improves the efficiency of system operations. However, having simple powerful system operations may increase the chances of human-induced faults. When that situation occurs, the API-controlled computing environment needs to be brought back to a normal state prior to the faults.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In a first aspect there is provided a computer-implemented method for determining undoability of an action to be conducted in an API-controlled computing system represented by a formal domain model, comprising:
  obtaining a set of pre-states of the API-controlled computing system for the action;
  obtaining a set of post-states of the API-controlled computing system corresponding to each pre-state in the set of pre-states for the action;
  automatically determining if each post-state in each set of post-states of the API-controlled computing system can be undone to its pre-state in the set of pre-states by using a reachability task for the post-state and its pre-state; and
  determining the action to be conducted in the API-controlled computing system is undoable if each post-state in each set of post-states of the API-controlled computing system can be undone to its pre-state in the set of pre-states.

It is an advantage that the invention applies the reachability task to the formal domain model of the API-controlled computing system, for example a cloud computing system, to automatically determine undoability of the action in the API-controlled computing system, which allows users to identify risks in their system operations and improves the reliability of system operation.

The set of pre-states may be a set of states before the action is conducted.

The set of pre-states may comprise only one pre-state of the API-controlled computing system for the action.

The undoability of the action may be examined at a state level, which determines the undoability of the action between a specific pre-state and its post-state set. The specific pre-state may be the current state of the API-controlled computing system.

The set of pre-states may comprise all possible pre-states of the API-controlled computing system for the action.

The undoability of the action may be examined at a general level, which determines the undoability of the action based on all possible pre-states that are applicable to the action.

The action may include at least one precondition and at least one effect, and the set of pre-states consists of states constructed from the at least one precondition and the at least one effect of the action, wherein the constructed states are sufficient to determine the undoability of the action.

The undoability of the action may be examined at a sufficient level, which determines the undoability of the action based on the states constructed from its at least one precondition and at least one effect. The constructed states may be sufficient to determine the general undoability of the action, which reduces computational burden of the method.

The formal domain model may comprise a formal domain model projected from the formal domain model.

The formal domain model projected from the formal domain model may represent a simplified version or subset of the formal domain model representing the API-controlled computing system.

The set of post-states may comprise only one post-state.

The action may be a deterministic action that produces only one deterministic state.

The set of post-states may comprise more than one post-states.

The action may be a non-deterministic action that produces one of more than one post-states.

The method may further comprise determining a solution to undo the action by using the reachability task if the action is undoable.

The method may further comprise allowing the action to be conducted if the action is determined to be undoable.

The method may further comprise preventing the action from being conducted or replacing the action with one or more substantially equivalent undoable actions if the action is not determined to be undoable.

The API-controlled computing system may comprise a memory-state-based system that is managed or operated only through an application program interface.

The formal domain model may comprise a planning domain model.

The action may comprise a planning action where appropriate.

The reachability task may comprise a planning task where appropriate.

The formal domain model may comprise a graph domain model where appropriate.

The action may comprise a graph action where appropriate.

The reachability task may comprise graph reachability analysis where appropriate.

In a second aspect there is provided a computer software program, including machine-readable instructions, when executed by a processor, causes the processor to perform the methods as described above.

In a third aspect there is provided a computer system for determining undoability of an action to be conducted in an API-controlled computing system represented by a formal domain model, the computer system comprising a processor that is adapted to:
- obtain a set of pre-states of the API-controlled computing system for the action;
- obtain a set of post-states of the API-controlled computing system corresponding to each pre-state in the set of pre-states for the action;
- automatically determine if each post-state in each set of post-states of the API-controlled computing system can be undone to its pre-state in the set of pre-states by using a reachability task for the post-state and its pre-state; and
- determine the action to be conducted in the API-controlled computing system is undoable if each post-state in each set of post-states of the API-controlled computing system can be undone to its pre-state in the set of pre-states.

In a fourth aspect there is provided a computer-implemented method for determining undoability of an API-controlled computing system, comprising:
- determining undoability of each action in a set of actions to be conducted in the API-controlled computing system according to the methods as described above where appropriate; and
- determining that the API-controlled computing system is undoable if each action in the set of actions to be conducted in API-controlled computing system is undoable.

In a fifth aspect there is provided a computer software program, including machine-readable instructions, when executed by a processor, causes the processor to perform the method where appropriate.

In a sixth aspect there is provided a computer system for determining undoability of an API-controlled computing system, the computer system comprising a processor that is adapted to:
- determine undoability of each action in a set of actions to be conducted in the API-controlled computing system according to the methods as described above where appropriate; and
- determine that the API-controlled computing system is undoable if each action in the set of actions to be conducted in the API-controlled computing system is undoable.

BRIEF DESCRIPTION OF THE DRAWINGS

At least one example of the invention will be described with reference to the accompanying drawings, in which.

It should be noted that the same numeral represents the same or similar elements throughout the drawings.

BEST MODES OF THE INVENTION

An API-controlled computing environment 100 that provides API-controlled computing resources will be described with reference to FIG. 1.

The API-controlled computing environment 100 includes an API-controlled computing system such as a cloud computing system 110, an undoability checker 120, one or more users 130. The API-controlled computing environment 100 is not intended to be limited to the configuration shown in FIG. 1, the present invention is also applicable to other forms of configuration. Moreover, in this specification, although the cloud computing system 110 is taken as an example of the API-controlled computing system in the API-controlled computing environment 100, the API-controlled computing system is not intended to be limited to the cloud computing system 110.

Cloud Computing System

The cloud computing system 110 consists of computing resources to be used by the user 130. These computing resources may include, but are not limited to, CPUs, memory, hard disk storage, IP addresses, DNS names, etc. These resources may be organised upon a request by the user 130 to form a virtual computing device, which is called a virtual machine in this specification, shown as virtual machine 1, virtual machine 2, virtual machine 3 and virtual machine 4 in FIG. 1. Then the user 130 starts the virtual machines to execute computing tasks, for example, but not limited to, image processing, document editing, and file storing and downloading.

The virtual machines in the cloud computing system 110 may normally have multiple attributes used by the user 130 to define the virtual machine. And the attributes of each virtual machine affect the state of the cloud computing system 110. For example, the virtual machine may have the following attributes:
- a resource identity assigned by the cloud computing system 110, for example, i-d21fa486;
- a machine type indicating the amount of computing resources allocated, for example, m1.small, which roughly equals to 1.2 GHz CPU and 1.7 GB RAM;
- public and private DSN names assigned by the cloud computing system 110, for example, ec2-111.compute.amazon.com;
- an identity of the machine image used to launch the virtual machine, for example, ami-a6a7e7f4, and;
- a launch timestamp.

The virtual machines are formed, changed or even terminated dynamically by invoking the API provided by the cloud computing system 110 where appropriate. Each time the API is invoked by the user 130, the API conducts an action in the cloud computing system 110, which may cause changes to the attributes of the virtual machines and in turn the state of the could computing system 110. For example, if a termination command is invoked by the user 130 to terminate the virtual machine 1, the computing resources associated with virtual machine 1 will be released to the cloud computing system 110 for later use by other users.

This changes the attributes of the virtual machine 1 and in turn affects the state of the could computing system 110.

Undoability Checker

Over the course of operation of the cloud computing system 110, some actions may produce undesired results, which may bring the system into an undesired state. Although some of the actions are easy to be undone, others are not. For example, to obtain a virtual machine whose machine image identity is same as that of the terminated virtual machine 1, the user 130 can simply launch a new virtual machine from the machine image used before. However, there is no way to obtain the same attributes of the ID or public DNS name if these have been used by other users after termination of the virtual machine 1.

The introduction of the undoability checker 120 according to present invention is to determine if the action to be conducted in the cloud computing system 110 can be undone before it is actually conducted. For example, users can determine whether it is possible to undo "terminating an instance" in their operational context such as re-obtaining an instance with the same machine image identity or re-obtaining an instance with the same public DNS name. If the action can be undone, the undoability checker 120 presents one or more plans consisting of actions that can bring the cloud computing system 110 back to its state immediately before that action.

The undoability checker 120 includes a processor 1201, memory 1202, a bus 1203 and a port 1204. The processor 1201 may be for example a general-purpose processor, an application-specific integrated circuit (ASIC) or a field-programmable gate array (FPGA), etc. The processor 1201, the memory 1202 and the port 1204 are connected with each other via the bus 1203, which carries data and instructions to be processed by the processor 1201. The processor 1201 fetches and performs instructions stored in the memory 1202 via the bus 1203 to determine the undoability of the action to be conducted in the cloud computing system 110 based on the states of the cloud computing system 110. The states of the cloud computing system 110 are received by the undoability checker 120 from the cloud computing system 110 via the port 1204. The port 1204 is a communication port used to receive and/or send data and instructions from and to the cloud computing system 110.

In this specification, the cloud computing system 110 is modelled by a planning domain model, which is also interchangeably called a planning domain or a domain. The planning domain model captures all available API operations and resources in the cloud computing system 110. As a result, the API-controlled computing environment 100 can be presented in a logic diagram in terms of undoability checking, which will now be described with reference to FIGS. 2-4.

Planning Domain Model

Figure 1:
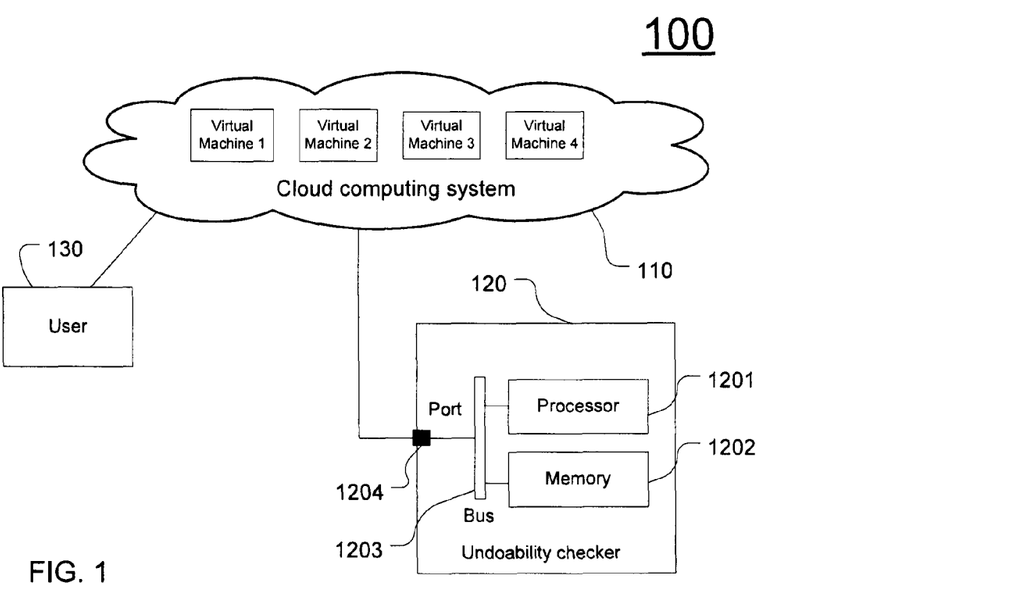
FIG. 1 is a diagram of an API-controlled computing environment with an undoabiblity checker to determine undoability of a cloud computing system according to an embodiment of the present invention.
Figure 2:
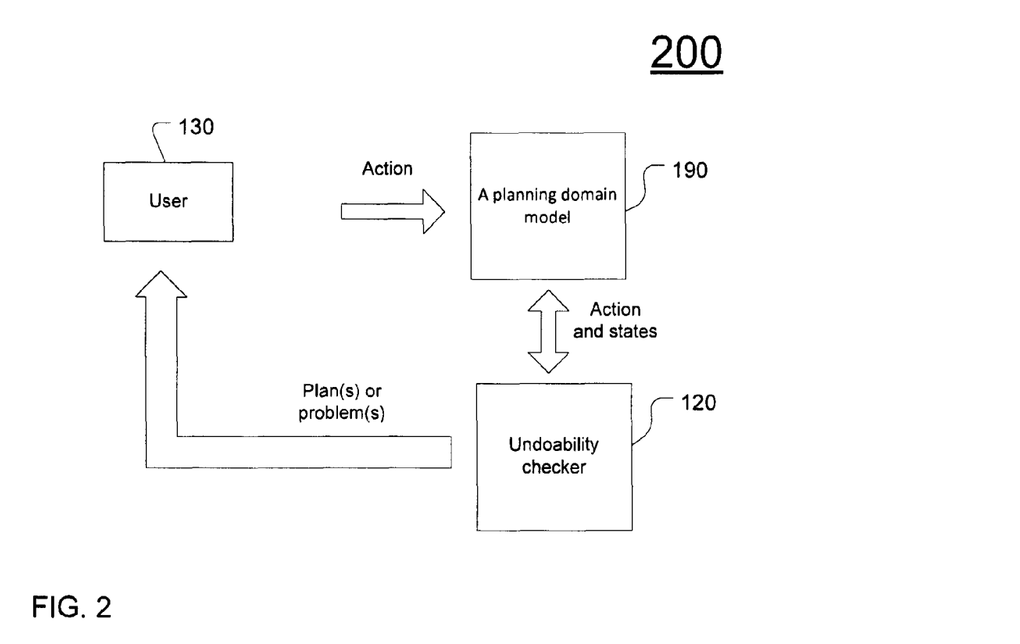
FIG. 2 is a schematic logic diagram of checking undoability of the cloud computing system shown FIG. 1 according to an embodiment of the present invention.

In FIG. 2, a planning domain model 150 is adopted to model the cloud computing system 110 in FIG. 1. As a result, the actions conducted by the user 130 in the cloud computing system 110 can be modelled as planning actions based on the planning domain model 150. The planning domain model 150 exchanges the planning actions and the states of the cloud computing system 110 with the undoability checker 120 for undoability checking, which in turn returns the result to the user 130.

The specific method to define and use the planning domain model is detailed in HOFFMANN, J., WEBER, I., AND KRAFT, F. *M SAP speaks PDDL: Exploiting a software-engineering model for planning in business process management. Journal of Artificial Intelligence Research* (*JAIR*) 44 (2012), 587-632 and WEBER, I. *Semantic Methods for Execution-level Business Process Modeling. PhD thesis, Universitat Karlsruhe* (*TH*), November 2009. Springer, *Lecture Notes in Business Information Processing* (*LNBIP*) Vol. 40, ISBN 978-3-642-05084-8, the contents of which are incorporated herein by reference.

For the purpose of completeness of this specification, we briefly describe the way to define and use the planning domain model 150 in this specification. It should be noted that, in the following description, standard logic and set symbols and terms are used to describe the planning domain model 150; therefore, the symbols and terms should be understood as their meaning under logic and set theories, respectively, where appropriate.

In this specification, predicates such as G, H, I, variables such as x, y, and constants such as c, d, e are the basic elements used to model the cloud computing system 110. Literals are (possibly negated) predicates from a set of finite predicates, whose arguments are variables or constants, for example G(x,y,c). If all arguments of a predicate are constants, the predicate is ground. These can be used to model the resources or configuration of the cloud computing system 110. For example, a constant i-d21fa486 refers to a specific machine ID, or a constant m1.small refers to a specific machine size. A variable refers to type of a constant. For example, a variable machine-ID indicates that a constant (for example, i-d21fa486) associated with the variable represents the identity of the virtual machine. A predicate refers to a statement or a function with variables or constants as arguments. For example, a predicate may take the form of machine-has-size (machine-ID, machine-size) with variables machine-ID, machine-size as its arguments. Before the predicate can be applied, the predicate must be instantiated with constants. For example, the above predicate may be instantiated as a ground literal machine-has-size (i-d21fa486, m1.small) where i-d21fa486, m1.small are the constants that instantiate the variables machine-ID, machine-size, which is called a predicate instance.

Given a set of variables X, the set of all literals which use only variables from X is denoted by $L^X$. If l is a literal, l[X] indicates that l uses variables X. If $X=\{x_1, \ldots, x_k\}$ and $C=\{c_1, \ldots, c_k\}$, where C is a set of constants applicable to X, $l[c_1, \ldots, c_k/x_1, \ldots, x_k]$ is used to denote the instantiation of l[X] with variables from C, which is also abbreviated as l[C].

In the planning domain mode 150, a planning action a is modelled as a tuple $(X_a, pre_a, Y_a, eff_a)$, where $X_a$ is a set of variables before the action a is conducted or inputs, $Y_a$ is a set of variables after the action a is conducted or outputs, $pre_a$ is a conjunction of literals from $L^{X_a}$, and $eff_a$ is a conjunction of literals from $L^{Y_a}$ (with $Y_a \subseteq X_a$). $pre_a$ is considered as the precondition of the planning domain model 150 to conduct the planning action a, and $eff_a$ is considered as the effect of the planning action a.

The elements, for example, predicates, variables, constants, literals, etc. used to model the cloud computing model 110 as the planning domain model 150 may be implemented using the Planning Domain Definition Language (PDDL).

Figure 4A:
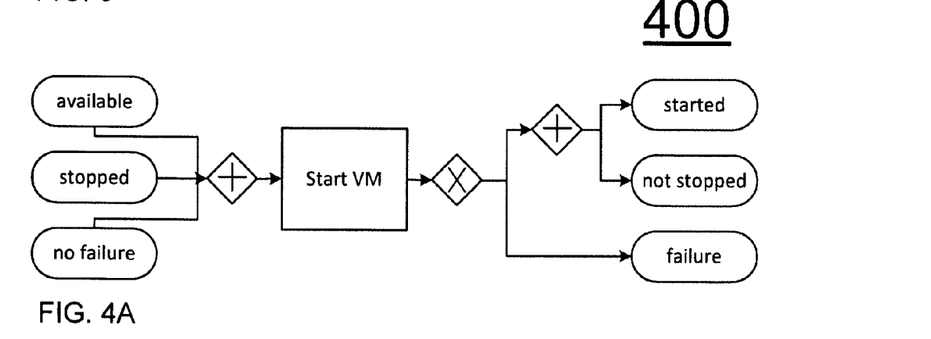
FIG. 4A-C are diagrams showing an example of a projection of a planning domain model.

A simple example for a planning domain model is shown in FIG. 4A, which simply includes a START VM action to be conducted on a virtual machine. It can be seen form FIG. 4A that the precondition for the START VM action is that the virtual machine is available and stopped and has no failure, and the effect of the action is that the virtual machine is started and not stopped OR there is a failure. For example, if a specific virtual machine such as the virtual machine identified by i-d21fa486 fulfills the precondition, then the START VM action can be conducted on the virtual machine i-d21fa486 and the effect of the action is that the the virtual machine i-d21fa486 is started and not stopped OR there is a failure in starting the virtual machine i-d21fa486.

Similar to a predicate, before an action can be applied, its variables must also be instantiated with constants, which yields an action instance. Formally, for an action $a=(X_a, pre_a, Y_a, eff_a)$ and a tuple of constants $C_a$, an action instance ai is given by $(pre_a, eff_a3=(pre,eff)[C_{ai}/X]$. The action's variables X are instantiated with the constants $C_{ai}$, and hence the instantiation of the variables Y is implied.

In practice, a finite set of predicate, variables and constants are used in the planning domain model 150 to model the cloud computing system 110. Therefore, a finite set of all predicate instances can be constructed. This is done for any given predicate G by finding any subset C' of the constants in C whose size equals the number of variables in G, finding any permutation $D:=\{c_1, \ldots, c_k\}$ of the constants in C', and substituting the permuted constants for the variables in G.

Given a set of predicates and constants, an interpretation is a truth assignment (i.e., true or false) for each predicate instance. If an interpretation concerns every predicate and every constant, it is called a state.

The planning domain model 150, whether it is complex or simple, can normally be connected with actions by planning tasks, the definitions of which are given below.

Planning Tasks

Definition 1. (Basic Planning Task)

A basic finite-domain planning task is a tuple (C, P, A, I, G). C is a set of constants, P is a set of predicates, and A is a set of actions, all as defined above. I is a complete interpretation representing the initial state, and G is general a partial interpretation representing the goal.

Definition 2. (Basic Plan)

Let (C, P, A, I, G) be a basic finite-domain planning task. Let s be a state, and let T be a sequence of actions from A. T is a solution for s iff either:
1. T is empty and sl=G; or
2. $T=\langle a \rangle \circ T'$, sl=$pre_a$, and T' is a solution for $s \oplus eff_a$.

If T is a solution for I, then T is called a basic plan.

Definition 3. (Planning Task)

A planning task is a tuple (C, P, A, I, G) whose elements are the same as in basic planning tasks, except for the action set A. Each $a \in A$ takes the form $(X_a, pre_a, Y_a, E_a)$ with $X_a$, $pre_a$, $Y_a$ as before, and $E_a$ being a set of partial variable assignments. The members $eff_a \in E_a$ are the outcomes of a.

The difference of the planning task shown in the above definition from a basic planning task is that an action can have multiple outcomes. In the example shown in FIG. 4A, this corresponds to the separation between the outcome (started and not stopped) and the outcome unrecoverable failure.

We denote with $A^d:=\{a \in A | |E_a|=1\}$ and $A^{nd}:=\{a \in A | |E_a|>1\}$ the sets of deterministic and non-deterministic actions of a planning task, respectively. If $a \in A^d$, then we denote the single outcome of a with $eff_a$. Further, we refer to the set of available non-deterministic actions which have not been used as $A_{av}^{nd}$, where av stands for "available". This only concerns action instances. The rationale behind this is that actions are likely deterministic behind the scenes: if a "check completeness of product ABC" action fails, calling the same action again for the same product will not yield a different result (unless ABC itself is changed).

Based on the changed notion of a planning task, the notion of a plan needs to be altered accordingly. In particular, a strong plan (which will always reach the goal) and a weak plan (which may or may not reach the goal, depending on the outcomes of actions in the plan) need to be distinguished.

Definition 4. (Strong Plan)

Let (C, P, A, I, G) be a planning task with $A=A^d \cup A^{nd}$. Let s be a state, let $A_{av}^{nd} \subseteq A^{nd}$, and let T be an action tree over $A \cup \{STOP\}$. T is said to be a strong solution for $(s, A_{av}^{nd})$ iff either:
1. T consists of the single node STOP, and sl=G; or
2. the root of T is $a \in A^d$, sl=$pre_a$, and the sub-tree of T rooted at a's child is a strong solution for $(s \oplus eff_a, A_{av}^{nd})$; or
3. the root of T is $a \in A_{av}^{nd}$, sl=$pre_a$, and, for each of a's children reached via an edge labeled with $eff_a \in E_a$, the sub-tree of T rooted at that child is a strong solution for $(s \oplus eff_a, A_{av}^{nd} \setminus \{a\})$.

If T is a strong solution for $(I, A^{nd})$, then T is called a strong plan.

Definition 5. (Weak Plan)

Let (C, P, A, I, G) be a planning task with $A=A^d \cup A^{nd}$. Let s be a state, let $A_{av}^{nd} \subseteq A^{nd}$, and let T be an action tree over $A \cup \{STOP, FAIL\}$. T is said to be a weak solution for $(s, A_{av}^{nd})$ iff either:
1. T consists of the single node STOP, and sl=G; or
2. the root of T is $a \in A^d$, sl=$pre_a$, and the sub-tree of T rooted at a's child is a weak solution for $(s \oplus eff_a, A_{av}^{nd})$; or
3. the root of T is $a \in A_{av}^{nd}$, sl=$pre_a$, and, for each of a's children reached via an edge labeled with $eff_a \in E_a$, we have that either: (a) the sub-tree of T rooted at that child is a weak solution for $(s \oplus eff_a, A_{av}^{nd} \setminus \{a\})$; or (b) the sub-tree of T rooted at that child consists of the single node FAIL, and there exists no action tree T' that is a weak solution for $(s \oplus eff_a, A_{av}^{nd} \setminus \{a\})$; where (a) is the case for at least one of a's children.

If T is a weak solution for $(I, A^{nd})$, then T is called a weak plan.

Definitions for Undoability

Undoability of an action is generally described as a reverse plan existing for the action. The definitions of undoability will now will described with reference to FIG. 3.

Figure 3:
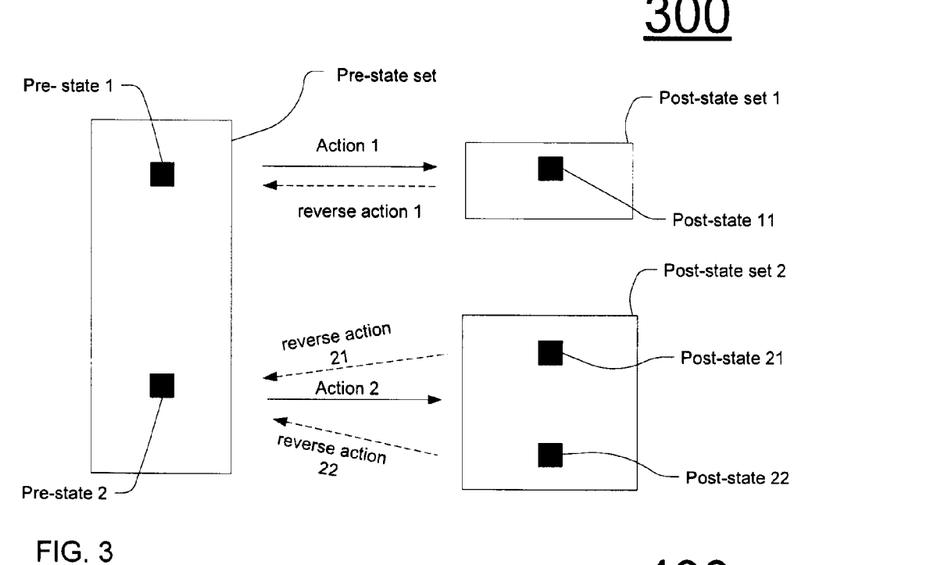
FIG. 3 is a schematic diagram indicating state transition of the cloud computing system.

FIG. 3 represents state transition of the cloud computing system 110 modelled by the planning domain model 150 after an action. It should be noted that the cloud computing system 110 can be in one of a set of states before an action is conducted, i.e., a set of pre-states (for example the pre-state set in FIG. 3). And the effect of the action can lead to one of a set of post-states (for example the post-state set 1 or the post-state set 2 in FIG. 3).

Definition 6

An action $a \in A$ is said to be undoable for state s iff sl=$pre_a$, and for every possible post-state s' with $s \oplus eff_a$=s', the planning problem (C, P, A, I, G) with s'l=I and sl=G has a plan. Furthermore:

if $A^{nd}=\emptyset$ or a strong plan T exists, a is said to be strongly undoable;

if this is not the case, but a weak plan T' exists, a is said to be weakly undoable;

otherwise a is said not to be undoable.

Note that the above definition covers both deterministic and non-deterministic actions. While deterministic actions will have only one post-state s' for the pre-state s, non-deterministic actions have multiple post-states. In the latter case, a is only called undoable if, for each of the possibly post-states, a plan back to s exists.

In the example shown in FIG. 3, the pre-state set includes a pre-state 1 and a pre-state 2 (the pre-state set may include more pre-states than shown in FIG. 3), each of which has a post-state set corresponding to an action conducted for the pre-state. Specifically, if Action 1 is conducted for the pre-state 1, the cloud computing system 110 will be in the post-state 11, which is the only one element in the post-state set 1. In this case, the Action 1 is called a deterministic action. For the pre-state 2, however, as shown in FIG. 3, the execution of Action 2 can produce one of the post-states in the post-state set 2. In this case, the Action 2 is called a non-deterministic action. Obviously, the Actions 1 and 2 are undoable for their respective pre-states 1 and 2 as a reverse action exist for each of their respective post-states. It should be noted that although only one action is shown for a specific pre-state and only one reverse action is shown for a specific post-state in FIG. 3, there may be multiple actions for the specific pre-state and multiple reverse actions for the specific post-state.

The above definition limits undoability of an action to a specific pre-state s, and the general undoability of an action is defined as below:

Definition 7

An action $a \in A$ is said to be generally undoable iff, for every possible pre-state s with $s|=pre_a$, a is undoable for s.

The above definition requires undoability of an action to be shown for each pair of pre and post-states of action a; in particular, the set of pre-states consists of states where the precondition of the action a is fulfilled. In practice, however, the set of pre-states may be a quite large finite set or an infinte set, which may make it impractical to determine the general undoability of the action by checking every pre-state in the pre-state set due to considerable computational burden.

In the following description, a sufficient set of pre-states are constructed based on the precondition and the effect of an action a to determine undoability of the action a to reduce the computational burden when determining the general undoability of the action a, where the function pred(.) returns the set of predicates used in the precondition or effect of the action, and gpred(.) likewise returns the set of ground predicates used in the precondition or effect of an action instance.

Definition 8

For an action a, assume the set of undo plans is given as $(T_1, T_2, \ldots )$, and the set of actions used in these plans is $A_u$. Assume further, that the finite set of relevant constants is given as C. Let $AI_a$ be the set of all possible action instances for a, given C. General undoability of a is given when each $ai \in AI_a$ is undoable for all states in a set of states constructed as follows:

A set of predicates P is defined as $P := ((\cup_{a' \in A_u} : pred(pre_{a'}) \cup pred(eff_{a'})) \cup pred(pre_a) \cup pred(eff_a))$, and the set of all ground predicates are formed from P and C as GP'. Then $GP := GP' \backslash gpred(pre_{ai})$ is defined. For each combination of truth assignments to the ground predicates in GP, a state is added to the set $S_{ai}$.

In all states in $S_{ai}$, all the ground predicates in the $pre_a$ have the value specified in $pre_{ai}$.

In all states in $S_{ai}$, all other ground predicates are set to false.

Denfinition 8 states that general undoability is given as soon as undoability can be shown for each state in the defined set. This set allows any combination of truth values for all predicates which are either considered by an instance of the action or by some action in its undo plan. Next, undoability for a whole planning domain model is defined.

Definition 9

A domain (C, P, A) is said to be undoable iff for each valid state s and any action sequence $a_1, a_2, \ldots$ resulting in a state s', the planning problem (C, P, A, I, G) with s'|=I and s|=G has a plan T. Furthermore:

if $A^{nd}=\emptyset$ or a strong plan T exists for all pairs s, s', (C, P, A) is said to be strongly undoable;

if this is not the case, but at least a weak plan T' exists for all pairs s, s', (C, P, A) is said to be weakly undoable;

otherwise (C, P, A) is said not to be undoable.

The set of all possible action sequences of the domain (C, P, A) is infinite. Hence, it is reasonable to postulate that the domain (C, P, A) is undoable iff all of its actions are undoable individually.

Definition 10.

A domain (C, P, A) is undoable if each of its actions is generally undoable. Specifically:

if $\forall a \in A$: a is strongly undoable, then (C, P, A) is strongly undoable;

if $\exists a \in A$: a is weakly undoable, but $\forall a \in A$: a is undoable, then (C, P, A) is weakly undoable;

otherwise (C, P, A) is not undoable.

Undoability of a whole domain is a strong guarantee, which means even one action results in an unrecoverable failure, the domain as a whole is not undoable. However, in most practical situations, such strong undoability is not required.

Projection of a Planning Domain Model

Cloud resources sometime suffer fatal failures. For example, after creating a resource, it may remain in the state "initializing" indefinitely; it then won't respond to any API calls. This type of failures, called unrecoverable failure, makes it hard to guarantee the undoability since those failures cannot be recovered using available API actions. They require human intervention. Therefore, it is reasonable to only consider the undoability in a domain (C, P, A) where unrecoverable failures do not occur. The simplified version (C', P', A') of the domain is a called a projection of the domain, which is roughly speaking a subset of the domain (C, P, A). The definition of a projection of a domain is given below.

Definition 11

A projection $\Pi$ from a domain (C, P, A) to another domain (C', P', A'), consists of a list of one or more of the following projection parts $\Pi_x$:

$\Pi_c(C) \mapsto C'$, where $C' \subset C$ (removal of constants).

$\Pi_p(P) \mapsto P'$, where $P' \subset P$. Removal of a predicate removes all appearances of this predicate in action preconditions and effects.

$\Pi_r(C,P) \mapsto (C',P')$, where $C'=C \cup \{r\}$ and $P=P' \cup \{R(.)\}$. This type of projection adds a role to a domain, such that constant r symbolizes the external view on the role, and predicate R(.) marks which other constant plays the role (internally). Concrete planning problems over the original domain (C, P, A) need to be adapted appropriately by replacing previous constants with r and marking which of the constants plays this role.

$\Pi_a(A) \mapsto A'$, where $A' \subset A$ or $A'=A\setminus\{a'\} \cup \{a''\}$ or $A'=A\setminus\{a'\} \cup \{a'', a'''\}$. Removing actions can be done analogously to constants. In addition, old actions (like a' above) can be replaced by either one or two other actions (like a" and a'" above).

It should be noted that a projection may be extended to allow arbitrary changes. In the present specification, the projection is in the sense of restriction, but that is not meant to limit the changes that can be applied in a projection. The general requirement is that the outcome of the projection is a valid domain. Hence, the above definitions in relation to undoability apply.

Figure 4B:
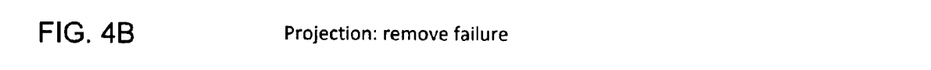
Figure 4C:
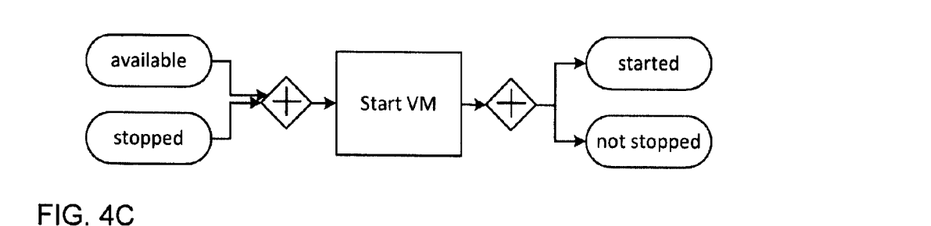

FIGS. 4A-C shows an example of a projection that removes the unrecoverable failures from the domain. FIG. 4A is an original domain including an action START VM and its precondition and effect, which contains unrecoverable failures. With the application of a projection called "remove failure", shown in FIG. 4B, to the domain, the failures are removed from the domain, and the resulting domain is the projection of the domain, as shown in FIG. 4C.

For practical purposes, it is expected to restrict the domain as little as possible, this is captured in the following definition.

Definition 12.

A projection $\Pi$ from a domain (C, P, A) to another domain (C', P', A') is said to be maximal with respect to undoability iff 1. (C', P', A') is undoable; and
2. none of the projection parts $\Pi_x$ can removed while maintaining 1.

The above defined maximal projection extends to strong/weak undoability of a domain in an obvious way.

Implementation

The necessary definitions have been discussed as above, and an implementation of the invention will now be described with reference to FIG. 5.

Figure 5:
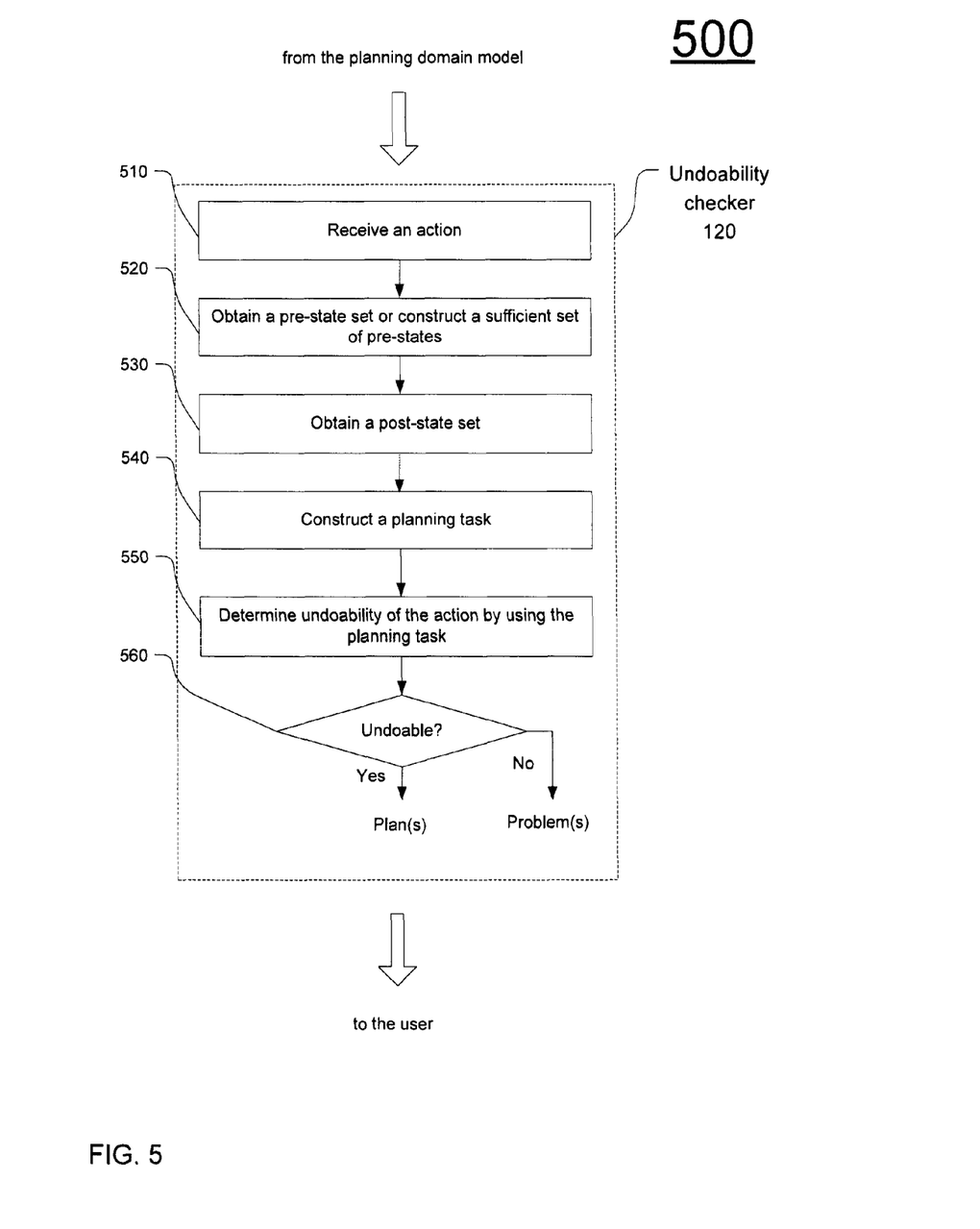
FIG. 5 is a flow chart showing the steps performed by the undoability checker to determine undoablity of a planning action conducted in the cloud computing system.

It should be noted that the implementation shown in FIG. 5 may be applied to both design phase and operation phase of the cloud computing system 110 where appropriate. Before the undoability checker 120 is applied, the constants (C), predicates (P), actions (A) used to model the planning domain model 150 (C, P, A) have been known to the undoability checker 120.

In the step 510, the undoability checker 120 receives an action from the planning domain model 150 (C, P, A) via the port 1204. As describe above, the action includes the precondition and effect for the action. It should be noted that the planning domain model 150 from which the undoability checker 120 receives the action may be a projection (C', P', A') of the planning domain model 150 (C, P, A) without departing from the scope of the invention as broadly described.

In the step 520, the processor 1201 of the undoability checker 120 extracts a set of pre-states from the action. The set of pre-states may include one or more states, which may represent one or more specific states of the cloud computing system 110, particularly, the current state of the cloud computing system 110. In this case, the undoability checker 120 is used to determine the undoability with respect to the specific one or more states. The set of pre-states may also include all possible states applicable to the action to determine the general undoability of the action.

Alternatively, as described above in relation to Definition 7, if the set of pre-states is a quite large finite set or an infinite set, a sufficient set of pre-states 3 is constructed as per Definition 8, covering a minimal set of distinct situations in which the action may be executed. Specifically:

All actions in the planning domain (C, P, A) have an implicit precondition: that the input parameters exist, and that they are of a certain type (formally modelable as type predicates). The processor 1201 checks all actions and collects the maximum of how many objects of which type are required by any of the actions (to fulfill the respective implicit preconditions). For instance, if action $a_1$ requires 2 virtual machines (VMs), and $a_2$ requires 3 VMs, then the processor 1201 records the number 3 for the type VM. The same process is done for predicates. Then a set C is constructed containing the maximal number of constants for each type, along with the type predicates (e.g., $vm_1$, $vm_2$, $vm_3$), and all domain constants C' with their respective types.

For each action a, an initial state s is built containing only the ground versions of the literals given by $pre_a$ plus C as constructed above. Then the set of actions $a' \in A':=A \setminus \{a\}$ is modified to have an empty precondition (other than the type constraints). For every possible outcome $eff_a$ of applying a in s, there is a post-state in the corresponding post-state set $s':=s \oplus eff_a$, then the processor 1201 solves the planning problem (C, P', A', $\{s'\}$, $\{s\}$). The resulting undo plan T is recorded. For each action a' in T, a' is removed from A' and an alternative plan T' is to be found. If it exists, this process proceeds as with T, so that each possible undo plan is found. Then these undo plans are used as per Definition 8, to construct the set of initial states 9 which need to be tested. (If no undo plan exists, undoability can simply be reported as not holding in the original domain: if, even with empty preconditions, no undo plan exists, then certainly no undo plan exists for the original problem.)

Alternatively, the processor 1201 alternatively applies the method of discovery based on backward chaining (a.k.a. bwd-discovery), as defined in WEBER, I. *Semantic Methods for Execution-level Business Process Modeling*. PhD thesis, Universitat Karlsruhe (TH), November 2009. Springer, *Lecture Notes in Business Information Processing* (LNBIP) Vol. 40, ISBN 978-3-642-05084-8 pp. 188-192. Hereby, all actions (referred to as services in the above-mentioned document) are discovered/selected that might be helpful to achieve a goal. This is done in an iterative fashion: for a list of literals (from the goal), each action that may achieve at least one of them is selected. The literals in the preconditions of these actions are added to the list. The iteration is performed until the set of selected actions becomes stable. The processor 1201 then uses the contributing actions as $A_u$ in Definition 8 to construct the set of initial states $\mathcal{J}$ which need to be tested.

With the process described above, the sufficient set of pre-states 5 is constructed.

In the step 530, the undoability checker 120 further extracts a set of post-states corresponding to each pre-state in the set of pre-states for the action, as described above in the step 520. Alternatively, the undoability checker 120 extracts a set of post-states corresponding to each pre-state in the sufficient set of the pre-states for the action. The set of post-states may include only one post-state, which means the action is a deterministic action. Alternatively, the set of post-states may include multiple post-states, which means the action is a non-deterministic action resulting in one of the multiple post-states.

Then in the step 540, for each pair (s, s'), an undo planning task is constructed as (C, P', A', {s'}, {s}). In other words, the undo planning task is to reach the pre-state s (before the action is conducted) from the post-state s' (after the action is conducted).

In the step 550, the undoability checker 120 determines the undoability of the action with the constructed undo planning task. Specifically, if a plan is found for each pair (s, s') of the action, the action is undoable. If not, the undoability checker 120 records any pair (s, s') that is not undoable.

In the step 560, the undoability checker 120 report the results of undoability checking to the user 130 depending on the undoability of the action. Specifically, if the action is undoable, the undoability checker 120 presents the plan or the reverse action for the action to the user 130; otherwise, the problems that cause the action not to be undoable are reported to the user 130.

The flow chart in FIG. 5 indicates a process of how to determine the undoability of an action. This process can be extended to determination of undoability of the whole domain as per Definition 10. Specifically, if each action is undoable, the (possibly projected) domain is undoable; otherwise, all pairs where no plan could be found are analyzed, and consolidated root-cause results (why undoability is not guaranteed) are reported to the user 130.

Other than the embodiment described above, with this invention, one can also design a same mode of the cloud computing system 110 where irreversible actions are prevented from being conducted or replaced. Specifically, if an action is determined as an undoable action with this invention, the action is allowed to be conducted by the user 130. If not, the action is prevented from being conducted by the user 130 by hiding from the user 130 or the action is replaced by one or more substantially equivalent undoable action(s) for example by turning a delete action into a pseudo-delete action. In the same mode of the cloud computing system 110, every action is undoable; as a result, the cloud computing system 110 can always be brought back to the state immediately before an action.

Further, although the invention is described with reference to an API-controlled computing system, particularly, a cloud computing system, it can also be applied to state-based systems that are managed or operated only through an API. In the state-based systems, for example productivity tools, the states of the systems are substantially defined through the state of memory for example RAM or disk.

It will be appreciated by persons skilled in the art that numerous variations and/or modifications may be made to the invention as shown in the specific embodiments without departing from the scope of the invention as broadly described.

In particular, another embodiment of the undoability checking may be implemented using graph domain models of graph actions and states as follows. A graph domain model is a bi-partite graph, consisting of the set of action instance nodes and state nodes, and arcs between the two (but not within either set). The states have the same meaning as above, i.e., they model the state of an API-controlled system. An action instance ai linked from a state s indicates that the action instance can be executed when the system is in state s, i.e., s is a pre-state of ai. The action instance ai may have one or more post-states s', i.e., when ai is executed, the system will transform from state s to one of the states s'. Undoability can be checked by performing graph reachability analysis: can state s be reached from any state s'? If so, the action instance ai is undoable. In addition to the graph structure, there is a mapping from actions to action instances inst: A→P(AI), such that ai=inst(a) indicates that ai is an instance of a. If all pre-states s are reachable from all respective post-states s' of each action instances ai for action a, then the action is generally undoable.

A person skilled in the art will appreciate that other formal models can be used to model the API-controlled system without departing from the scope of the invention as broadly described. A formal domain model is therefore referred to as the general concept of a model that models actions, action instances (which may default to the actions, if only one instantiation exists), states, and the relation therebetween. In this way, (i) pre-states and post-states of actions and action instances can be associated with each other, and (ii) undoability can be checked through reachability analysis, for example, plan existence for planning tasks. The graph domain model and the planning domain model described above are two concrete examples of this formal domain model.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "receiving" or "obtaining" or "determining" or "sending" or "reporting" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The invention claimed is:

1. A computer-implemented method for determining undoability of an action to be conducted in an API-controlled computing system represented by a formal domain model, comprising:

obtaining a set of pre-states of the API-controlled computing system for the action;

obtaining a set of post-states of the API-controlled computing system corresponding to each pre-state in the set of pre-states for the action;

automatically determining if each post-state in each set of post-states of the API-controlled computing system can be undone to its pre-state in the set of pre-states by using a reachability task for the post-state and its pre-state; and determining the action to be conducted in the API-controlled computing system is undoable if each post-state in each set of post-states of the API-controlled computing system can be undone to its pre-state in the set of pre-states.

2. The method according to claim 1, wherein the set of pre-states comprises only one pre-state of the API-controlled computing system for the action.

3. The method according to claim 1, wherein the set of pre-states comprises all possible pre-states of the API-controlled computing system for the action.

4. The method according to claim 1, wherein the action includes at least one precondition and at least one effect, and the set of pre-states consists of states constructed from the at least one precondition and the at least one effect of the action, wherein the constructed states are sufficient to determine the undoability of the action.

5. The method according to claim 1, wherein the formal domain model is a formal domain model projected from another formal domain model representing the API-controlled computing system.

6. The method according to claim 1, wherein the set of post-states comprises only one post-state.

7. The method according to 1, wherein the set of post-states comprises more than one post-states.

8. The method according to claim 1, the method further comprising determining a solution to undo the action by using the reachability task if the action is undoable.

9. The method according to claim 1, further comprising allowing the action to be conducted if the action is determined to be undoable.

10. The method according to claim 1, further comprising preventing the action from being conducted or replacing the action with one or more substantially equivalent undoable actions if the action is not determined to be undoable.

11. The method according to claim 1, wherein the API-controlled computing system comprises a memory-state-based system that is managed or operated only through an application program interface.

12. The method according to claim 1, wherein the formal domain model comprises a planning domain model.

13. The method according to claim 12, wherein the action comprises a planning action.

14. The method according to claim 12, wherein the reachability task comprises a planning task.

15. The method according to claim 1, wherein the formal domain model comprises a graph domain model.

16. The method according to claim 15, wherein the action comprises a graph action.

17. The method according to claim 15, wherein the reachability task comprises graph reachability analysis.

18. A non-transitory computer-readable medium, including computer-executable instructions stored thereon, for determining undoability of an action to be conducted in an API-controlled computing system represented by a formal domain model, when executed by a processor, causes the processor to:
obtain a set of pre-states of the API-controlled computing system for the action;
obtain a set of post-states of the API-controlled computing system corresponding to each pre-state in the set of pre-states for the action;
automatically determine if each post-state in each set of post-states of the API-controlled computing system can be undone to its pre-state in the set of pre-states by using a reachability task for the post-state and its pre-state; and
determine the action to be conducted in the API-controlled computing system is undoable if each post-state in each set of post-states of the API-controlled computing system can be undone to its pre-state in the set of pre-states.

19. A computer system for determining undoability of an action to be conducted in an API-controlled computing system represented by a formal domain model, the computer system comprising a processor that is adapted to:
obtain a set of pre-states of the API-controlled computing system for the action;
obtain a set of post-states of the API-controlled computing system corresponding to each pre-state in the set of pre-states for the action;
automatically determine if each post-state in each set of post-states of the API-controlled computing system can be undone to its pre-state in the set of pre-states by using a reachability task for the post-state and its pre-state; and
determine the action to be conducted in the API-controlled computing system is undoable if each post-state in each set of post-states of the API-controlled computing system can be undone to its pre-state in the set of pre-states.

20. A computer-implemented method for determining undoability of an API-controlled computing system, comprising:
determining undoability of each action in a set of actions to be conducted in the API-controlled computing system according to claim 1; and
determining that the API-controlled computing system is undoable if each action in the set of actions to be conducted in API-controlled computing system is undoable.

21. A non-transitory computer-readable medium, including computer-executable instructions stored thereon for determining undoability of an API-controlled computing system, when executed by a processor, causes the processor to:
determine undoability of each action in a set of actions to be conducted in the API-controlled computing system by:
obtaining a set of pre-states of the API-controlled computing system for the action;
obtaining a set of post-states of the API-controlled computing system corresponding to each pre-state in the set of pre-states for the action;
automatically determining if each post-state in each set of post-states of the API-controlled computing system can be undone to its pre-state in the set of pre-states by using a reachability task for the post-state and its pre-state; and
determining the action to be conducted in the API-controlled computing system is undoable if each post-state in each set of post-states of the API-controlled computing system can be undone to its pre-state in the set of pre-states; and
determine that the API-controlled computing system is undoable if each action in the set of actions to be conducted in API-controlled computing system is undoable.

22. A computer system for determining undoability of an API-controlled computing system, the computer system comprising a processor that is adapted to:
determine undoability of each action in a set of actions to be conducted in the API-controlled computing system by:
obtaining a set of pre-states of the API-controlled computing system for the action;

obtaining a set of post-states of the API-controlled computing system corresponding to each pre-state in the set of pre-states for the action;

automatically determining if each post-state in each set of post-states of the API-controlled computing system can be undone to its pre-state in the set of pre-states by using a reachability task for the post-state and its pre-state; and determining the action to be conducted in the API-controlled computing system is undoable if each post-state in each set of post-states of the API-controlled computing system can be undone to its pre-state in the set of pre-states; and determine that the API-controlled computing system is undoable if each action in the set of actions to be conducted in the API-controlled computing system is undoable.

* * * * *

UNITED STATES PATENT AND TRADEMARK OFFICE
CERTIFICATE OF CORRECTION

PATENT NO. : 9,519,528 B2  
APPLICATION NO. : 14/784887  
DATED : December 13, 2016  
INVENTOR(S) : Hiroshi Wada et al.

It is certified that error appears in the above-identified patent and that said Letters Patent is hereby corrected as shown below:

In the Specification  
Column 7, Line 10 Should Read As Follows:  
$ai$ is given by $(pre_{ai}, \mathit{eff}_{ai}) = (pre, \mathit{eff})\,[C_{ai}/X]$. The action's Column 12, Line 19 Should Read As Follows:  
instance, if action $a_1$ requires 2 virtual machines (VMs), Column 12, Lines 63-64 Should Read As Follows:  
With the process described above, the sufficient set of pre-states $\mathcal{J}$ is constructed.

Signed and Sealed this  
Sixteenth Day of May, 2017

Michelle K. Lee  
*Director of the United States Patent and Trademark Office*